United States Patent [19]

Hayberg et al.

[11] 4,351,630

[45] Sep. 28, 1982

[54] PIVOTING HINGE EXERCISING MECHANISM

[75] Inventors: Robert S. Hayberg, Pembroke Lakes; Eugene L. Foltuz, Hollywood, both of Fla.

[73] Assignee: Global Precision Inc., Hollywood, Fla.

[21] Appl. No.: 221,917

[22] Filed: Dec. 31, 1980

[51] Int. Cl.³ ............................................. B29D 31/00
[52] U.S. Cl. ...................................... 425/517; 29/453; 249/58; 264/238; 264/339; 425/DIG. 3
[58] Field of Search ........... 249/58; 425/517, DIG. 3; 264/339, 238; 29/453

[56] References Cited

U.S. PATENT DOCUMENTS 3,477,095 11/1969 Lensky ............................... 29/453 X
3,663,146 5/1972 Roffey ............................... 249/58 X

FOREIGN PATENT DOCUMENTS 62145 6/1955 France ........................... 425/DIG. 3

Primary Examiner—Thomas P. Pavelko
Attorney, Agent, or Firm—Cushman, Darby & Cushman

[57] ABSTRACT

A device for exercising a living hinge of an article and/or closing a lid of a cap while the article or cap is in a mold for forming the article or cap. The device includes a finger which slides between the mold sections, and, in the process, engages a portion of the article or the lid, rotates the portion or lid about the hinge, and in the case of the cap, snaps the lid shut. In an alternate preferred embodiment, when the finger reaches predetermined point it pivots toward the female mold section to snap the lid tightly shut.

23 Claims, 7 Drawing Figures

PIVOTING HINGE EXERCISING MECHANISM

BACKGROUND OF THE INVENTION

1. Field of the Invention

This invention relates to devices for automatically handling articles being molded. More specifically, this invention relates to devices for exercising living hinges of articles and closing lids of caps, while the articles and caps are in the mold.

2. Description of the Prior Art

The advantages of molding articles, both with respect to efficiency and cost, have been recognized for an extremely long period of time. More recently, materials have been discovered, such as certain plastics, from which living hinges can be molded. A living hinge, as used herein, is a flexible piece which is molded integrally with the components being hinged. This distinguishes from a typical hinge which is not molded integrally, with any pivoting taking place between two or more separate pieces, rather than within a piece. The low manufacturing costs of molded living hinges make them particularly advantageous. The low costs result from less critical tolerances necessary in a living hinge, and an elimination of the need for subsequent hinge assembly.

FIG. 1 shows a lid 10 connected to a cap 12 by means of a living hinge 14. Living hinge 14 includes pivots 16 and 18 and a spring 20, all of which are molded integrally with lid 10 and cap 12. Living hinge 14 is known as a snap-hinge, because lid 10 has a neutral position at which spring 20 has no effect. However, when lid 10 is not at the neutral position, spring 20 tends to force lid 10 away from the neutral position.

To close lid 10, it is pivoted toward cap 12, through the neutral position. Lid 10 is then depressed so that a skirt 22 fits within a wall 26 defining an aperture 24.

Living hinges are common in many other types of articles, also. For example, other types of caps with connected lids may employ living hinges. Also, tape cassettes which are molded in a single piece and then folded to form the housing employ living hinges. In fact, living hinges may be utilized wherever an inexpensive hinge is desired in association with a molded article.

However, care must be taken while molding a living hinge to be certain that the hinge works freely and easily. To ensure free movement, the hinge must be exercised while it is still hot. Otherwise, the hinge will be relatively inflexible upon cooling.

With caps such as illustrated in FIG. 1, a problem exists in ensuring a proper tightness between skirt 22 and wall 26. The problem arises from the fact that plastic employed in the molding process tends to shrink during cooling.

A common approach to ensure a proper fit is to employ different materials for lid 10 and cap 12. It is well known that different plastics shrink to different degrees. With some experimentation and calculation, it is possible to employ this characteristic to obtain a proper fit.

A much easier and more effective solution is to close lid 10 onto cap 12 while the plastic is still hot. If skirt 22 cools while inserted within aperture 24, the two parts tend to shrink together, thus forming a proper fit.

In the past, a mold for making caps such as illustrated in FIG. 1 usually had 8 or 16 cavities for making 8 or 16 caps simultaneously. To close lids 10, as the core and female mold sections separated, the shafts of air pistons, disposed within the mold (one associated with each mold cavity) would be activated to push lids 10 a small distance out of the mold. Air jets, one associated with each cavity, would then be activated to force the lids past their neutral positions.

When the mold sections had separated sufficiently, a rather large air sweep would come down between the sections and align with the mold cavities. Air pistons on the air sweep would then be actuated to cause the shafts of the air pistons to close the lids. The air pistons would then be deactivated and the air sweep would be removed from between the mold sections before the next molding cycle could begin.

This method of closing lids has proven to be slow and costly. A great deal of time is wasted in the mechanical motion of the air sweep. The air sweep must be constructed with a great deal of precision so that when it is lowered, it lines up accurately with the mold cavities. Because of the precision with which this large piece of equipment must be aligned, repairing and realigning the air sweep become seemingly continuous tasks.

Furthermore, with particularly small caps, it has been found that the air jets employed for pushing lids 10 beyond the neutral position do not have sufficient power to push lids 10 because of the small surface area of the smaller caps.

SUMMARY OF THE INVENTION

The present invention overcomes these problems by simplifying the lid closing apparatus and the motions necessary to close the lids. In the present invention, air pistons within the mold push the lids a bit out of the cavities as the mold sections separate. A finger then slides parallel to the surface of the mold section and perpendicular to the axis of the hinge of the cap. The finger includes a number of portions each adapted to engage a lid. As the portions engage the lids, the lids rotate with respect to the hinges and are pushed past the neutral position so that the lids approach the closed position. The height of the finger is such that as the finger continues to advance, it forces the lids to snap into the fully closed position.

In an alternative preferred embodiment of this invention, the fingers are able to pivot, and are aligned so that they are a bit higher from the mold surface. After the finger pushes the lids past the neutral positions, and the lid engaging portions of the finger are located above the center of the lid skirts, the finger pivots so that the lid engaging portions of the finger move downward to snap the lids into a fully closed position. In the preferred embodiment, the lid engaging portions of the finger are rollers.

Thus, the present invention provides a sure, simple and quick apparatus for closing lids while in the mold. In fact, the present invention is so quick that it reduces the cap molding cycle time by 4 or 5 seconds. On the average, a mold may operate over 1100 cycles each day. By reducing each cycle by 4 or 5 seconds, the number of caps that can be manufactured by the same mold is greatly increased.

Also, an entire set of air pistons in the air sweep and devices for positioning the air sweep are completely eliminated. This results in a significant reduction in the cost of the equipment, and an even greater improvement in the ease of maintenance. Because the equipment is so significantly simplified, fewer repair and alignment problems exist.

Finally, the present invention is effective not only with any type or size of cap, but also with any article which has a living hinge which must be exercised during cooling.

BRIEF DESCRIPTION OF THE DRAWING

These and other objects and advantages of the invention will become more apparent and more readily appreciated from the following detailed description of the presently preferred exemplary embodiments of the invention taken in conjunction with the accompanying drawing, of which.

DETAILED DESCRIPTION OF THE PREFERRED EMBODIMENTS

Figures 1, 2:
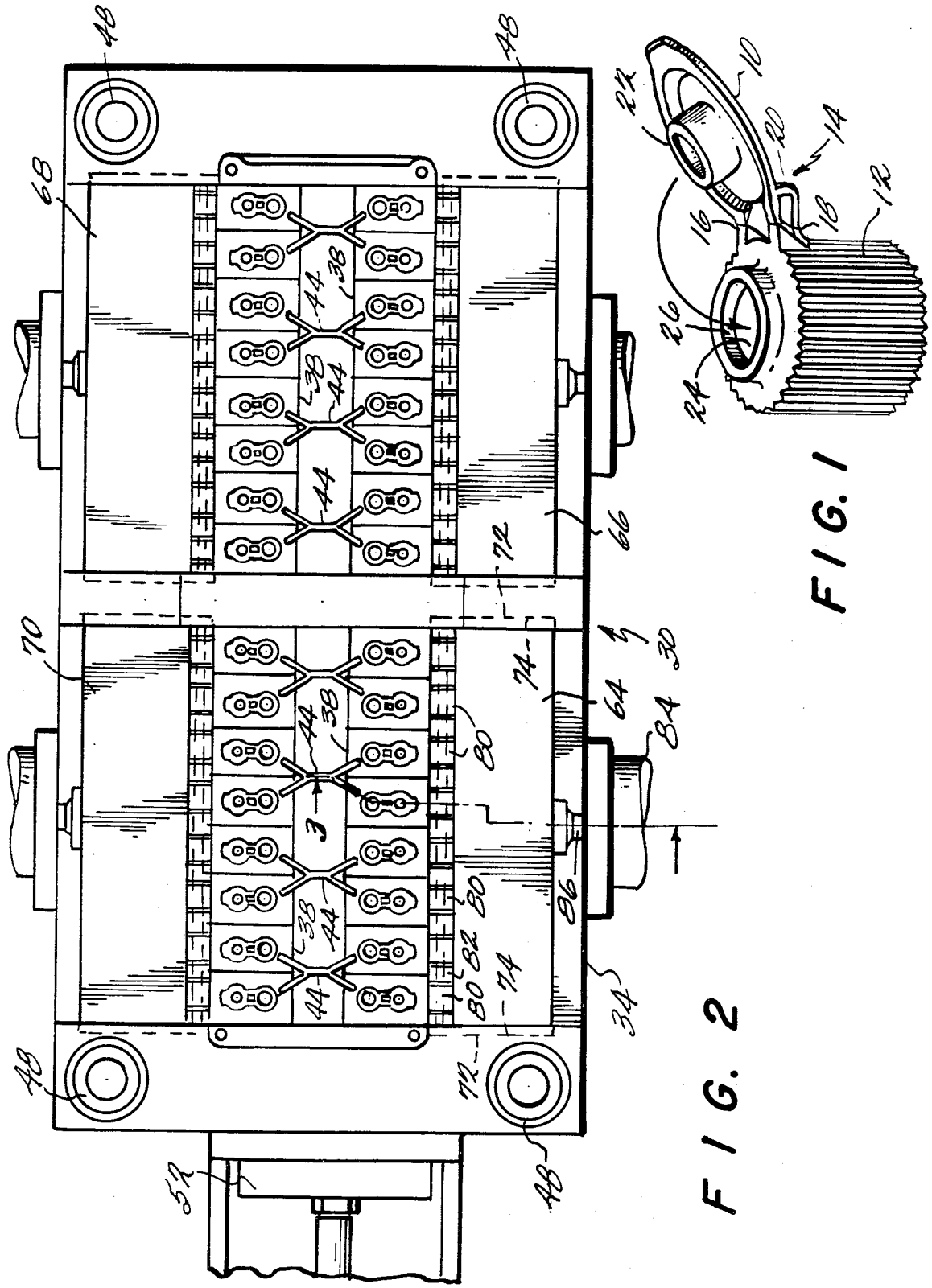
FIG. 1 is a perspective view of a snap hinge-closure cap.
FIG. 2 is a plan view of a female mold section made in accordance with one embodiment of the present invention.
Figure 3:
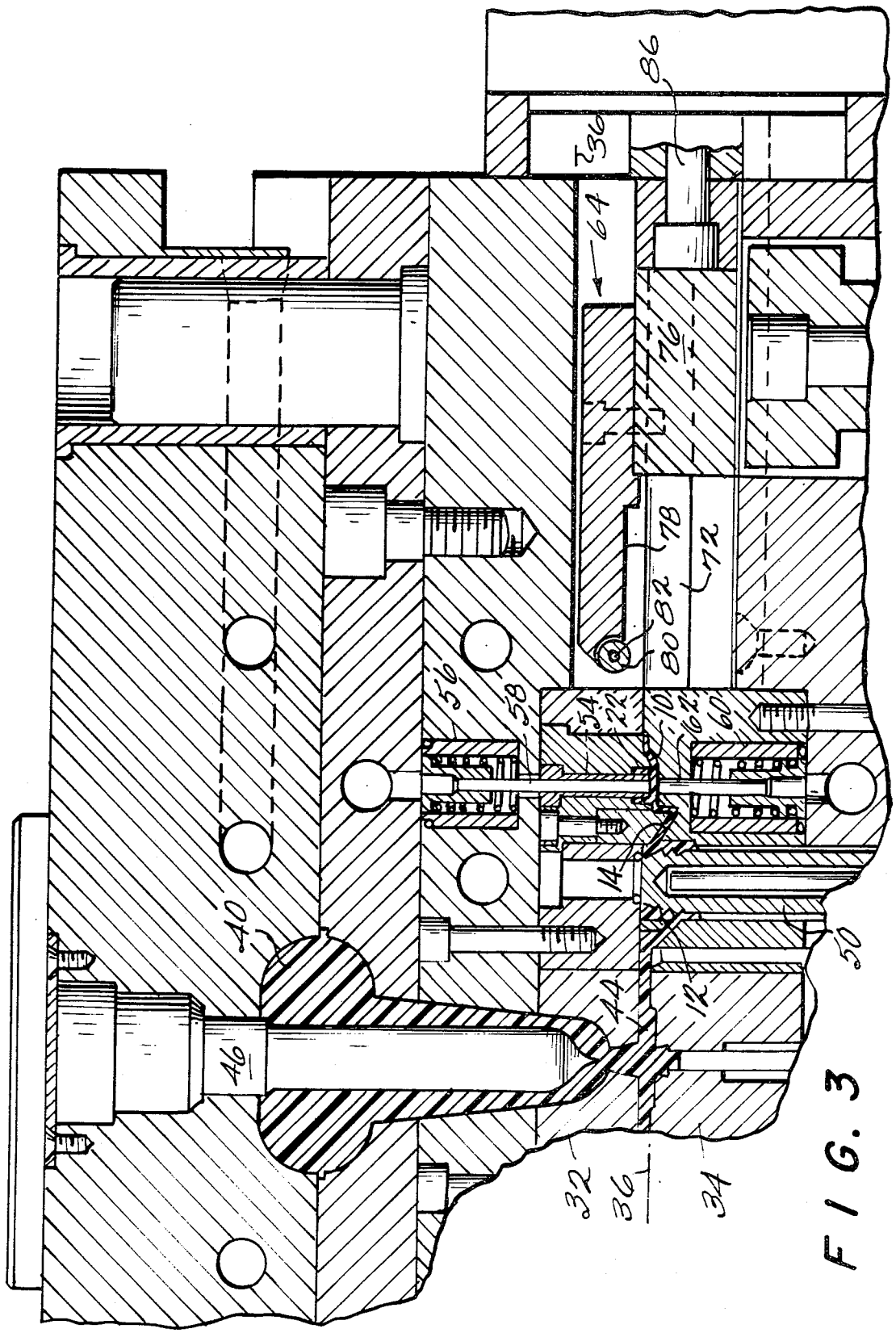
FIG. 3 is a section view of one embodiment of the present invention taken along the 3—3 line of FIG. 2.

FIGS. 2 and 3 illustrate a mold 30, in accordance with the present invention, for making caps such as illustrated in FIG. 1. Mold 30 includes a core section 32 and a female cavity section 34. The sections divide along a line 36 in FIG. 3. It is female section 34 that is illustrated in FIG. 2. The component parts of mold 30 are not illustrated in detail, and will not be described in detail, since mold 30 is conventional and those skilled in the art understand well how to make and use a mold which would be suitable for forming caps as illustrated in FIG. 1.

Mold 30 includes 32 cavities 38 in which the caps are actually molded, so that mold 30 is capable of forming 32 caps simultaneously. The material to be molded (in the preferred embodiment, plastic) flows from sources 40 to channels 44 which direct the molten plastic to the various cavities 38. Each source 40 provides the plastic for 4 cavities. Heating elements 46 ensure that the plastic from sources 40 is sufficiently liquid. Pillars 48, mounted on female section 34 and extending through holes in core section 32, guide core section 32 as it moves toward and away from female section 34 during the molding process.

The cap illustrated in FIG. 1 has threads on its inner surface. Cores 50 (one for each cavity 38) (see FIG. 3) have external threads at the top to form the threads in the caps. Conventional rack and pinion apparatus 52 (see FIG. 2) is employed to rotate cores 50 to remove cores 50 from the caps after the molding process is finished. Rack and pinion apparatus 52 is standard apparatus, well known in the art, for removing internal thread forming cores.

Sleeves 54 (one for each cavity 38) are employed in core section 32 to form skirts 22 of lids 10. As the mold sections separate, air pistons 56 are energized to extend shafts 58 so that lids 10 are not pulled up with sleeves 54 as the mold sections separate.

As will be readily understood by those skilled in the art, what has been described above is a conventional mold employing conventional techniques for forming the cap illustrated in FIG. 1. Such molds are not new, and in fact have been in use for a number of years. Described below will be the apparatus for closing lids 10 while caps 12 are still in the mold.

For each cavity 38 air piston 60 is provided within female section 34. After core section 32 has separated from female section 34, air pistons 60 are energized and shafts 62 of pistons 60 extend upwardly to push lids 10 away from the surface of female section 34.

As illustrated in FIG. 2, finger assemblies 64, 66, 68 and 70 are provided, one for each of the four portions of mold 30. Finger assemblies 66, 68 and 70 are identical to finger assembly 64, and therefore the following detailed description of finger assembly 64 will enable those skilled in the art to make and use finger assemblies 66, 68 and 70.

Finger assembly 64 slidably engages female section 34 by means of slots 72 in female section 34 and projections 74 in a slide 76 of finger assembly 64 (see FIG. 3). Attached to slide 76 is a closing finger 78. Rollers 80 are rotatably connected to closing finger 78 by means of a shaft 82. An air cylinder 84 drives finger assembly 64 through a shaft 86.

In operation, female section 34 approaches core section 32 along posts 48. After the mold sections have come together, liquid plastic from sources 40 is injected into cavities 38. After the plastic has cooled sufficiently in cavities 38, female section 34 begins to lift off of core section 32. As the mold sections separate, air pistons 56 are energized to strip the molded cap off of core section 32 and maintain lids 10 in female section 34.

Figure 4:
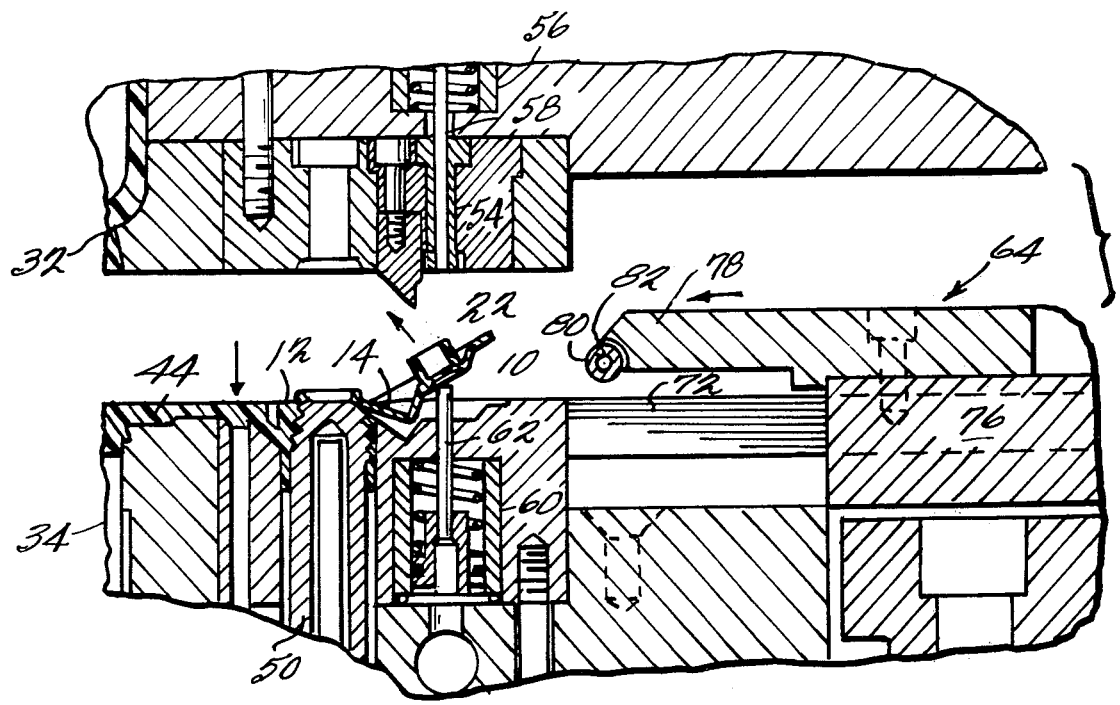
FIG. 4 is a section view similar to the view in FIG. 3, but at a different stage of operation of the present invention.

As illustrated in FIG. 4, after section 34 has separated sufficiently from core section 32, air pistons 60 are activated so that shafts 62 push lids 10 out of female section 34. Air cylinder 84 is then activated to push finger assembly 64 towards lids 10. As each roller 80 engages a lid 10, lid 10 pivots about hinge 14 until the position is reached as illustrated in solid lines in FIG. 5. Finger assembly 64 then continues to advance to the position shown in dashed lines in FIG. 5. As finger assembly 64 advances to this position, it causes lid 10 to snap tightly onto cap 12. The height of closing member 78 above the surface of section 34 is carefully adjusted so that as finger assembly 64 advances to the position shown in dashed line in FIG. 5, lid 10 is snapped fully shut without being crushed.

Figure 5:
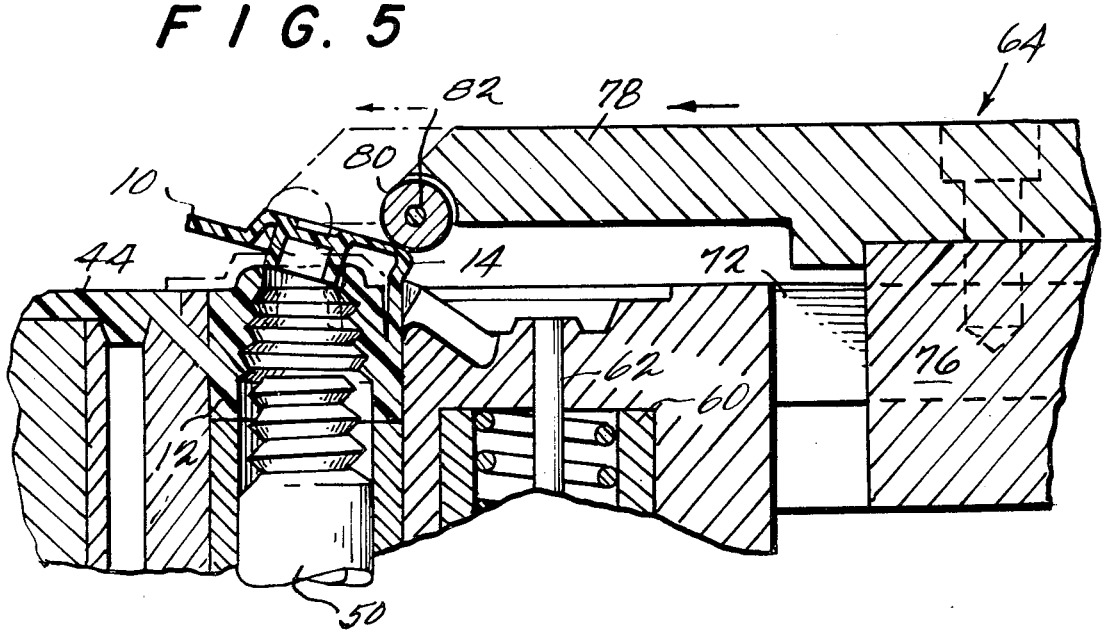
FIG. 5 is a section view of the embodiment in FIGS. 2-4, but at a different stage of operation.

At the same time, core 50 rotates, withdrawing from the newly formed threads in cap 12. FIG. 5 illustrates core 50 fully withdrawn from the threads of cap 12. At the same time, finger assembly 64 reverses its direction of motion, returning to its original position before cap 12 is ejected.

Figure 6:
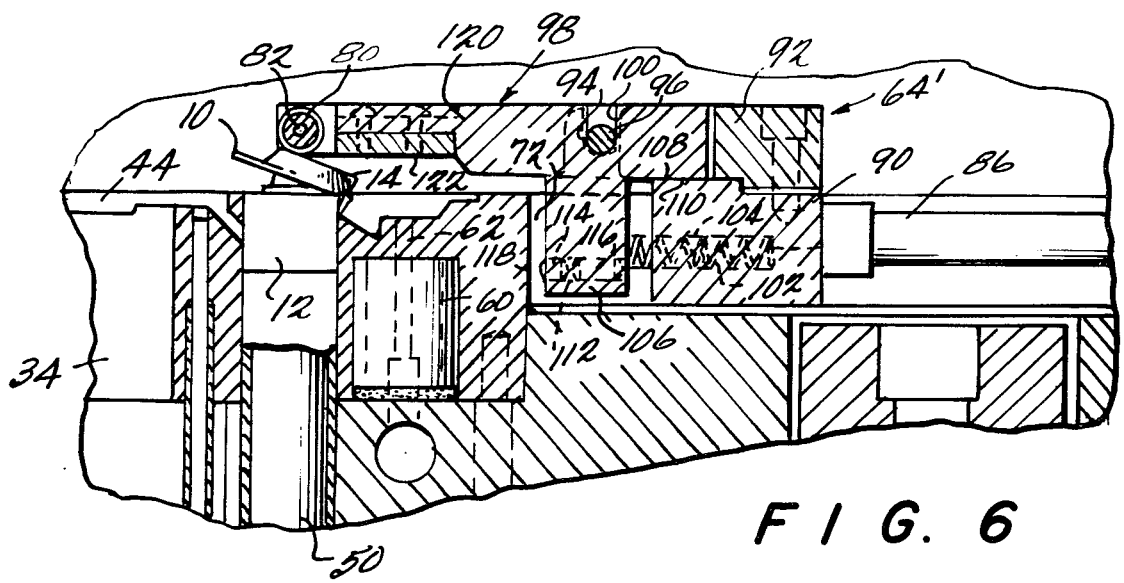
FIG. 6 is a section of another embodiment of the present invention.
Figure 7:
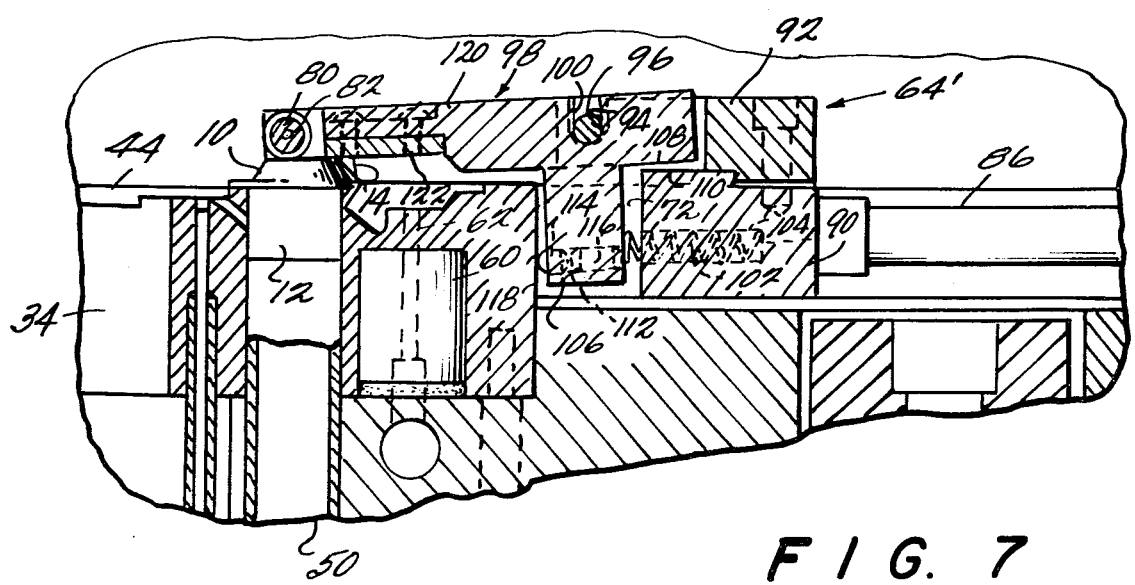
FIG. 7 is a similar section of the same embodiment in FIG. 6, but at a different stage of operation.

FIGS. 6 and 7 illustrate an alternative preferred finger assembly, referred to in FIGS. 6 and 7 as finger assembly 64'. In FIGS. 6 and 7, the same numbers as used in FIGS. 2 through 5 are employed to refer to similar or corresponding elements.

Finger assembly 64' consists of a slide 90 having projections which slide along slot 72 of female section 34. Slide 90 is driven, as with the previous embodiment, by an air cylinder via shaft 86. Rigidly connected to slide 90 is a pivot support 92. Pivot support 92 has several projections each containing a slot 94 aligned along an axis. A pivoting member 98 also has projections, interdigitated with the projections of pivot support 92. Slots 100, disposed in the projections of pivoting member 98, are aligned along a common axis with slots 94. A pin 96 is disposed within slots 94 and 100 to enable pivoting member 98 to pivot about pin 96.

A spring 102 is partially disposed within an aperture 104 in slide 90, and protrudes from slide 90. In fact, spring 102 is sufficiently long to exert a force against a projection 106 of pivoting member 98. This tends to bias pivoting member 98 in a clockwise direction as illustrated in FIGS. 6 and 7. This clockwise pivoting is limited by the content of a surface 108 of pivoting member 98 with a surface 110 of slide 90.

Projection 106 of pivoting member 98 has a threaded aperture 112 within which an adjusting set screw 114 and a locking set screw 116 are disposed. The distance that set screw 114 extends beyond projection 106 can be adjusted to determine the degree that pivoting member 98 pivots in a counterclockwise direction against spring 102 when set screw 114 contacts a surface 118 of female section 34.

Pivoting member 98 also includes a closing finger 120 and a clamp plate 122, which each have aligning projections between which rollers 80 are disposed on a shaft 82. Shaft 82 is positioned by aligned grooves in the projections of closing finger 120 and clamp plate 122.

The molding operation of the FIGS. 6 and 7 embodiment is similar to that described above with respect to the embodiment illustrated in FIGS. 2-5. After the mold sections have separated, shafts 62 extend upwardly to lift lids 10 out of female section 34. Shaft 86 then drives finger assembly 64' toward lids 10, causing lids 10 to pivot about hinges 14.

An important difference between the embodiment illustrated in FIGS. 2-5 and the embodiment illustrated in FIGS. 6 and 7 is that pivoting member 98 in FIGS. 6 and 7 is higher above the surface of female section 34 than closing finger 78 in FIGS. 2-5, so that as the tip of set screw 114 reaches wall 118 (as illustrated in FIG. 6) rollers 80 have not snapped lids 10 shut. As shaft 86 continues to drive finger assembly 64' forward, set screw 114 contacts wall 118, which causes pivoting member 98 to rotate counterclockwise against spring 102. This pivoting causes rollers 80 to move downwardly, snapping lids 10 tightly shut. As shaft 86 withdraws, pivoting member 98 rotates clockwise, under the action of spring 102, until surface 108 contacts surface 110. Pivoting member 98, then slides parallel to the surface of female section 34 until finger assembly 64' has fully retracted.

Thus, in this embodiment, the longitudinal motion of pivoting member 98 causes lids 10 to be moved past the neutral position to the position illustrated in FIG. 6. The pivoting motion of pivoting member 98 causes lids 10 to be snapped tightly onto cap 12. With this embodiment, less force need be exerted on lids 10, as compared to the embodiment illustrated in FIGS. 2-5, and therefore, the surfaces of lids 10 are less likely to be marred during the process.

Although only a few exemplary embodiments of this invention have been described in detail above, those skilled in the art will readily appreciate that many modifications are possible in the exemplary embodiments without materially departing from the novel teachings and advantages of this invention. For example, rollers 80 may be replaced with solid curved surfaces. If this change is made, however, lids 10 are more likely to be marred during the closing process. The visibility of the marring can be minimized by selecting a dark colored plastic.

Accordingly, all such modifications are intended to be included within the scope of this invention as defined in the following claims.

What is claimed is:

1. A device for exercising a living hinge of an article while in a mold for forming said article, said device comprising:
    a finger including a portion adapted for engagement with said article;
    means for slidably connecting said finger to said mold, said connecting means enabling said finger to slide in a first direction transverse to said hinge from a first position to a second position and enabling said finger to move in a second direction having a component normal to said first direction after said finger has reached said second position, said connecting means being oriented to enable said finger to engage a portion of said article and rotate said article portion about said hinge as said finger moves in said first and second directions; and
    means for driving said finger.

2. In a mold for forming an article having a living hinge, a device for exercising said hinge while said article is in said mold, said device comprising:
    a finger including a portion adapted for engagement with said article;
    means for slidably connecting said finger to said mold, said connecting means enabling said finger to slide in a first direction transverse to said hinge from a first position to a second position and enabling said finger to move in a second direction having a component normal to said first direction after said finger has reached said second position, said connecting means being oriented to enable said finger to engage a portion of said article and rotate said article portion about said hinge as said finger moves in said first and second directions; and
    means for driving said finger.

3. A device for closing a lid of a cap while in a mold for forming said cap, said lid being pivotably connected to said cap by a hinge, said device comprising:
    a finger including a portion adapted for engagement with said cap;
    means for slidably connecting said finger to said mold, said connecting means enabling said finger to slide in a first direction transverse to said hinge from a first position to a second position and enabling said finger to move in a second direction having a component normal to said first direction after said finger has reached said second position, said connecting means being oriented to enable said finger to engage said lid and rotate said lid about said hinge as said finger moves in said first and second directions; and
    means for driving said finger.

4. In a mold for forming a cap having a lid, said lid being pivotably connected to said cap by a hinge, a device for closing said lid while said cap is in said mold, said device comprising:
    a finger including a portion adapted for engagement with said cap;
    means for slidably connecting said finger to said mold, said connecting means enabling said finger to slide in a first direction transverse to said hinge from a first position to a second position and enabling said finger to move in a second direction having a component normal to said first direction after said finger has reached said second position, said connecting means being oriented to enable said finger to engage said lid and rotate said lid about said hinge as said finger moves in said first and second directions; and means for driving said finger.

5. A device for exercising a living hinge of an article while in a mold for forming said article, said device comprising:

a finger including a portion adapted for engagement with said article;

means, pivotably connected to said finger, for slidably connecting said finger to said mold, said connecting means enabling said finger to slide transverse to said hinge from a first position to a second position, and to pivot after said finger has reached said second position, said connecting means being oriented to enable said finger to engage a portion of said article and rotate said article portion about said hinge as said finger slides and pivots; and means for driving said finger.

6. A device as in claim 1 or 5 wherein said finger includes a plurality of portions, each adapted for engagement with one said article, respectively.

7. A device as in claim 1 or 5 further comprising an air piston disposed within said mold and having a shaft for pushing said article portion out of the mold.

8. In a mold for forming an article having a living hinge, a device for exercising said hinge while said article is in said mold, said device comprising:

a finger including a portion adapted for engagement with said article;

means, pivotably connected to said finger, for slidably connecting said finger to said mold, said connecting means enabling said finger to slide transverse to said hinge from a first position to a second position, and to pivot after said finger has reached said second position, said connecting means being oriented to enable said finger to engage a portion of said article and rotate said article portion about said hinge as said finger slides and pivots; and means for driving said finger.

9. A device for closing a lid of a cap while in a mold section for forming said cap, said lid being pivotably connected to said cap by a hinge, said device comprising:

a finger including a portion adapted, for engagement with said cap;

means, pivotably connected to said finger, for slidably connecting said finger to said mold, said connecting means enabling said finger to slide transverse to said hinge from a first position to a second position, and to pivot after said finger has reached said second position, said connecting means being oriented to enable said finger to engage said lid and rotate said lid about said hinge as said finger slides and pivots; and means for driving said finger.

10. A device as in claim 1, 3, 5, or 9 wherein one of said mold and connecting means has slots and the other of said mold and said connecting means slides in said slots.

11. In a mold for forming a cap having a lid, said lid being pivotably connected to said cap by a hinge, a device for closing said lid while said cap is in said mold, said device comprising:

a finger including a portion adapted for engagement with said cap;

means, pivotably connected to said finger, for slidably connecting said finger to said mold, said connecting means enabling said finger to slide transverse to said hinge from a first position to a second position, and to pivot after said finger has reached said second position, said connecting means being oriented to enable said finger to engage said lid and rotate said lid about said hinge as said finger slides and pivots; and means for driving said finger.

12. A device for exercising a living hinge of an article while in a mold for forming said article, said device comprising:

a finger including a roller adapted for engagement with said article;

means for slidably connecting said finger to said mold, said connecting means enabling said finger to slide in a first direction transverse to said hinge from a first position to a second position and enabling said finger to move in a second direction having a component normal to said first direction after said finger has reached said second position, said connecting means being oriented to enable said roller to engage a portion of said article and rotate said article portion about said hinge as said finger moves in said first and second direction; and means for driving said finger.

13. A device for closing a lid of a cap while in a mold for forming said cap, said lid being pivotably connected to said cap by a hinge, said device comprising:

a finger including a roller adapted for engagement with said lid;

means, pivotably connected to said finger, for slidably connecting said finger to said mold, said connecting means enabling said finger to slide transverse to said hinge from a first position to a second position, and to pivot after said finger has reached said second position, said connecting means being oriented to enable said roller to engage said lid and rotate said lid about said hinge as said finger slides and pivots; and means for driving said finger.

14. A device for exercising a living hinge of an article while in a mold for forming said article, said device comprising:

a finger including a portion adapted for engagement with said article;

a slide assembly slidably connected to said mold section to slide transverse to the axis of said hinge from a first position to a second position;

means for pivotably connecting said finger to said slide assembly;

said finger including means for limiting the pivoting of said finger beyond a third position in a first direction;

means for biasing said finger in said first direction;

means for causing said finger to pivot in a second direction opposite said first direction after said slide assembly reaches said second position; and means for driving said finger from said first position to said second position.

15. A device as in claim 1, 3, 5, 9, or 14 wherein said finger portion includes a roller.

16. A device as in claim 1, 3, 5, 9 or 14 wherein said finger portion has a curved surface.

17. A device for closing a lid of a cap while in a mold section for forming said cap, said lid being pivotably connected to said cap by a hinge, said device comprising:
- a finger having a portion adapted for engagement with said lid;
- a slide assembly slidably connected to said mold section to slide transverse to the axis of said hinge from a first position to a second position;
- means for pivotably connecting said finger to said slide assembly;
- said finger including means for limiting the pivoting of said finger beyond a third position in a first direction;
- means for biasing said finger in said first direction;
- means for pivoting said finger in a second direction opposite said first direction after said slide assembly reaches said second position; and
- means for driving said finger from said first position to said second position.

18. A device for closing a lid of a cap while in a mold section for forming said cap, said lid being pivotably connected to said cap by a hinge, said device comprising:
- a finger having a roller adapted for engagement with said lid;
- a slide assembly slidably connected to said mold section to slide transverse to the axis of said hinge from a first position to a second position;
- means for pivotably connecting said finger to said slide assembly;
- said finger including means for limiting the pivoting of said finger beyond a third position in a first direction;
- means for biasing said finger in said first direction;
- means for pivoting said finger in a second direction opposite said first direction after said slide assembly reaches said second position; and
- means for driving said finger from said first position to said second position.

19. A device for closing a lid of a cap while in a mold section for forming said cap, said lid being pivotably connected to said cap by a hinge, said device comprising:
- a finger having a roller adapted for engagement with said lid;
- a slide assembly slidably connected to said mold section to slide transverse to the axis of said hinge and parallel to a surface of said mold section from a first position to a second position;
- means for pivotably connecting said finger to said slide assembly;
- said finger including means for limiting the pivoting of said finger beyond a third position in a first direction;
- a spring disposed between said finger and said slide assembly for biasing said finger in said first direction;
- a protrusion disposed on said finger below said connecting means;
- a stop disposed on said mold, said protrusion and stop being disposed so that as said slide assembly approaches said second position, said protrusion engages said stop to cause said finger to rotate in a second direction opposite said first direction; and
- means for driving said finger from said first position to said second position.

20. A device as in claim 19 wherein one of said mold section and said slide assembly has slots and the other of said mold section and said slide assembly slides in said slots.

21. A device as in claim 1, 3, 5, 9, or 19 wherein said driving means includes an air piston.

22. A device as in claims 3, 9 or 19 wherein said finger includes a plurality of rollers, each of said rollers adapted for engagement with one said lid, respectively.

23. A device as in claim 3, 9, or 19 further comprising an air piston disposed within said mold and including a shaft for pushing said lid out of the mold.

* * * * *